Dec. 19, 1933.  G. D. TURNBOW  1,940,194
METHOD OF MANUFACTURING FROZEN FOOD PRODUCTS
Filed May 6, 1932  3 Sheets-Sheet 1

Inventor
Grover D. Turnbow,
By Church & Church
His Attorneys

Dec. 19, 1933.  G. D. TURNBOW  1,940,194
METHOD OF MANUFACTURING FROZEN FOOD PRODUCTS
Filed May 6, 1932  3 Sheets-Sheet 2

Inventor
Grover D. Turnbow,
By Church & Church
His Attorneys

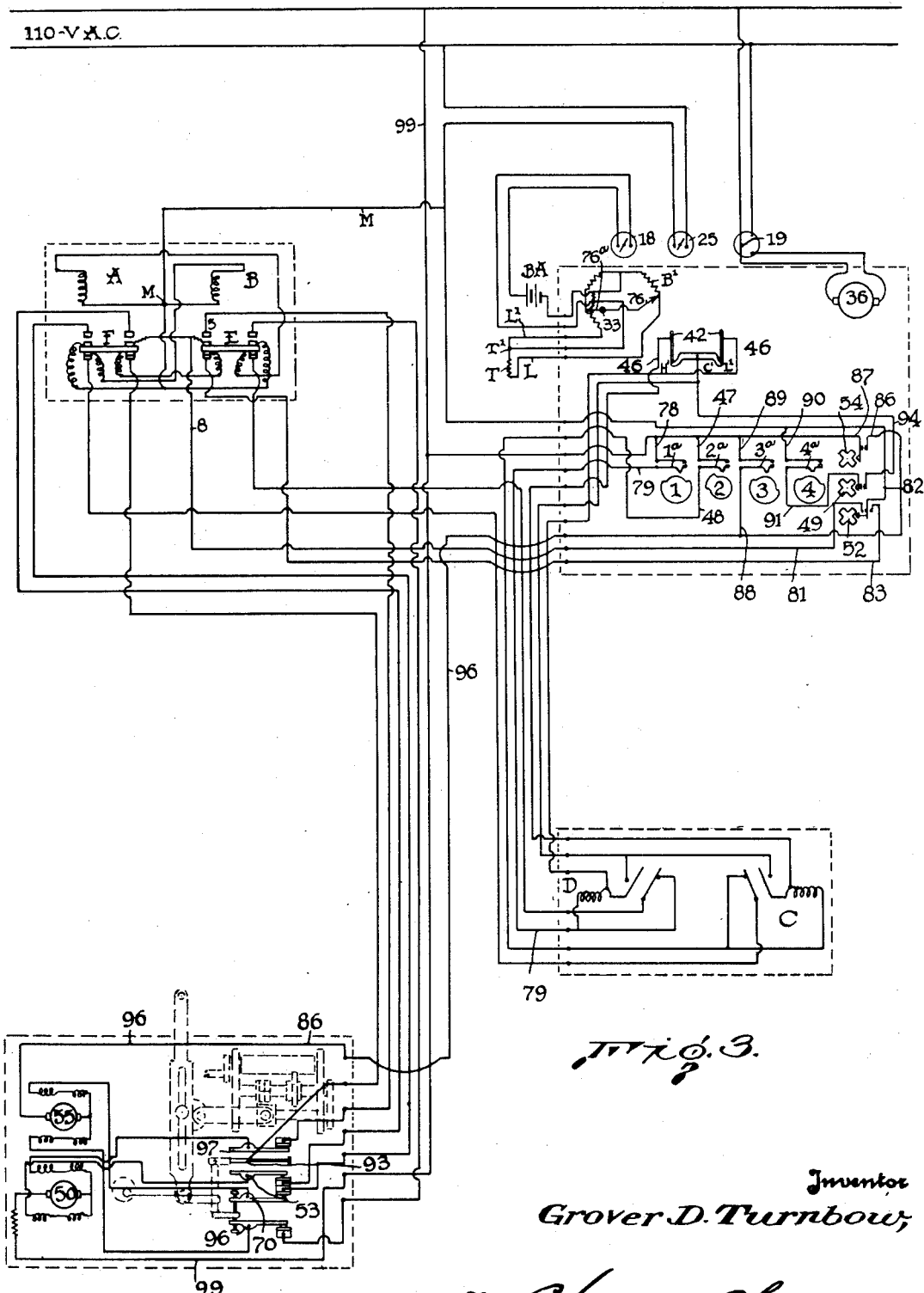

Patented Dec. 19, 1933

1,940,194

UNITED STATES PATENT OFFICE 1,940,194

METHOD OF MANUFACTURING FROZEN FOOD PRODUCTS

Grover D. Turnbow, Oakland, Calif.

Application May 6, 1932. Serial No. 609,749

6 Claims. (Cl. 62—173)

This invention relates to improvements in the manufacture of frozen food products, such as ice-cream, ices, sherbets and the like, and particularly to an improved method for the continuous manufacture of products of that character.

Products of the nature specified are produced from liquids and semi-liquids and have incorporated therein, as a normal constituent, air or some suitable gas, and the primary object of this invention is to incorporate in the finished frozen food product, a desired or predetermined volume of such air or gas. More particularly, the object of the invention is to automatically control, in a relatively simple manner, the percentage of air or gas incorporated in the finished product, the method employed being especially applicable to a procedure wherein the freezing of the product is carried on continuously.

It has been found that the air holding properties of ice cream mixes and the like vary with the freezing of the mix, and that a relatively small variance in the extent to which a mix is frozen, materially alters the volume of air that will be held by the mix. This discovery is made the basis of the present invention. It is a very important contribution to the art of manufacturing frozen food products of the class above mentioned. Especially is it true where the product is produced by a method that is performed continuously. Furthermore, through the use of the present invention, the overrun of ice cream can be so accurately and definitely controlled that it is wholly feasible to market or sell ice cream on the basis of weight, a procedure which has up to the present day been universally considered by the industry as impractical, because of the great variation which has existed in the weight of ice cream per unit of volume, this variance being due to the differences in the volume of air or gas incorporated in ice-cream produced by present-day methods. Such variances in the air or gas content naturally affect the weight per unt of volume.

The present method is not limited to any particular form of apparatus and for this reason it is deemed unnecessary to illustrate apparatus in detail. Therefore, there is disclosed in the present drawing a diagrammatic illustration of apparatus for carrying out the present invention.

Heretofore there have been some efforts made to control temperatures in the freezing compartment of apparatus used in the production of ice cream, and similar products, but there has never been any appreciation of the fact that the extent to which a given mix is frozen or that the temperature of the mix, determines the volume of air or gas that will be held by the mix. That is, that the percentage of air incorporated and retained in the mix can be controlled by the extent to which the mix is frozen, or through temperature regulation in the freezing chamber. For example, it has been found that with a usual commercial ice cream mix, a variance of .066 of a degree Fahrenheit in the temperature of the mix will affect the capacity of the mix to hold incorporated air approximately 1% when the temperature is such that the air-holding capacity of the mixture is approximately 50%. That is, with a given temperature for the mix, at which the air-holding capacity of the mix is approximately 50%, which is the equivalent of 100% overrun, a variance of the extent just mentioned will alter the air-holding properties of the mix 1% or the overrun 2%. Therefore, a variance of one degree in the freezing will alter the air-holding properties approximately 15% and the overrun 30%. In view of this, it is apparent that by using the temperature control apparatus of the prior art, the latitude allowed was such that the percentage of air incorporated in frozen food products could not be accurately regulated within the desired narrow and definite limits. Likewise, the fact that such a slight variation in extent of freezing is magnified to such an extent in overrun, shows conclusively that the former proponents of temperature control never realized the relation between freezing and air incorporation. In this connection, it should also be stated that with a normal mix, there is a certain point of freezing at which that mix has a maximum air-holding property which is lessened as the mix goes above or below that point. This is true regardless of the volume of air which may be brought into contact with the mix. Therefore, the present invention proposes the use of automatic control apparatus sufficiently sensitive for determining the extent of freezing or the temperature of the mix for carrying out this regulation of air incorporation. Such mechanism preferably consists of a modified balancing potentiometer controller, as disclosed in Leeds' Patent No. 1,097,651, granted May 26, 1914, involving the principle of the Wheatstone bridge, being the measurement of resistance which is particularly adaptable to the measurement of temperature, based upon the difference in the resistance of a conductor due to changes in temperatures to which the conductor is subjected.

Other prior patented mechanisms that may be utilized in practicing the present method are:

Leeds' Patent No. 965,824, granted July 26, 1910, which involves the system wherein the movable member has the indicator needle which controls the periodical closure of a path over which mechanical energy may be transmitted to exercise suitable control or to actuate any suitable mechanism.

Gibson's Patent No. 1,578,279, granted March 30, 1926, which involves an improved type of balancing mechanism for maintaining a predetermined ratio between two fluids of flow, and provides an improved form of relay mechanism for actuation or control by a delicate device such as a needle of a sensitive galvanometer, and capable of exerting power impulses in response to such control.

Brewer's Patent No. 1,356,804, granted October 19, 1920, which devises a more accurate method of operating control circuits by means of cams and may be employed in controlling temperature through the use of the Wheatstone bridge, potentiometer or any other suitable means or arrangement employed in association with a galvanometer.

Disclosures in the above patents utilized in connection with Patent No. 1,739,903 by Johanson, granted December 17, 1929, and improvements as disclosed in Patent No. 1,829,722 by Wilhjelm, granted November 3, 1931, may be utilized to operate quickly and accurately valves responsive to change in temperature of the product under control, the mechanism being such as to provide means for operating the valves in any one of an indefinite number of positions, being so arranged as to allow for a predetermined time interval if desired. To obtain the results desired, temperature control, as previously pointed out, must be on a plane thus far not utilized, and any movement in the valve causing a "hunting" action or "over-shooting" must be substantially eliminated. To prevent this, Leeds' Patent No. 1,332,182, granted February 24, 1920, and Parker's Patent No. 1,830,333, granted November 3, 1931, are utilized to make use of their anticipatory action which prevents "over-shooting", and a reduction of the time interval to approximately one-half of the time of former available mechanisms, thus producing almost instantaneous control without the previous degree of "over-shooting". With apparatus falling within the scope of the teaching of the foregoing patents it has been found possible to obtain temperature control action within one one-hundredth (0.01) of a degree Fahrenheit, and thereby control the refrigerating medium used in freezing the ice-cream, whereby the temperature of the product may be regulated to less than ten hundredths (0.10) of a degree Fahrenheit at any point within the freezing chamber.

In the accompanying drawings, illustrating more or less diagrammatically one preferred form of apparatus:

Fig. 3 is a wiring diagram for the apparatus illustrated in each of Figures 1 and 2.

Figure 1:
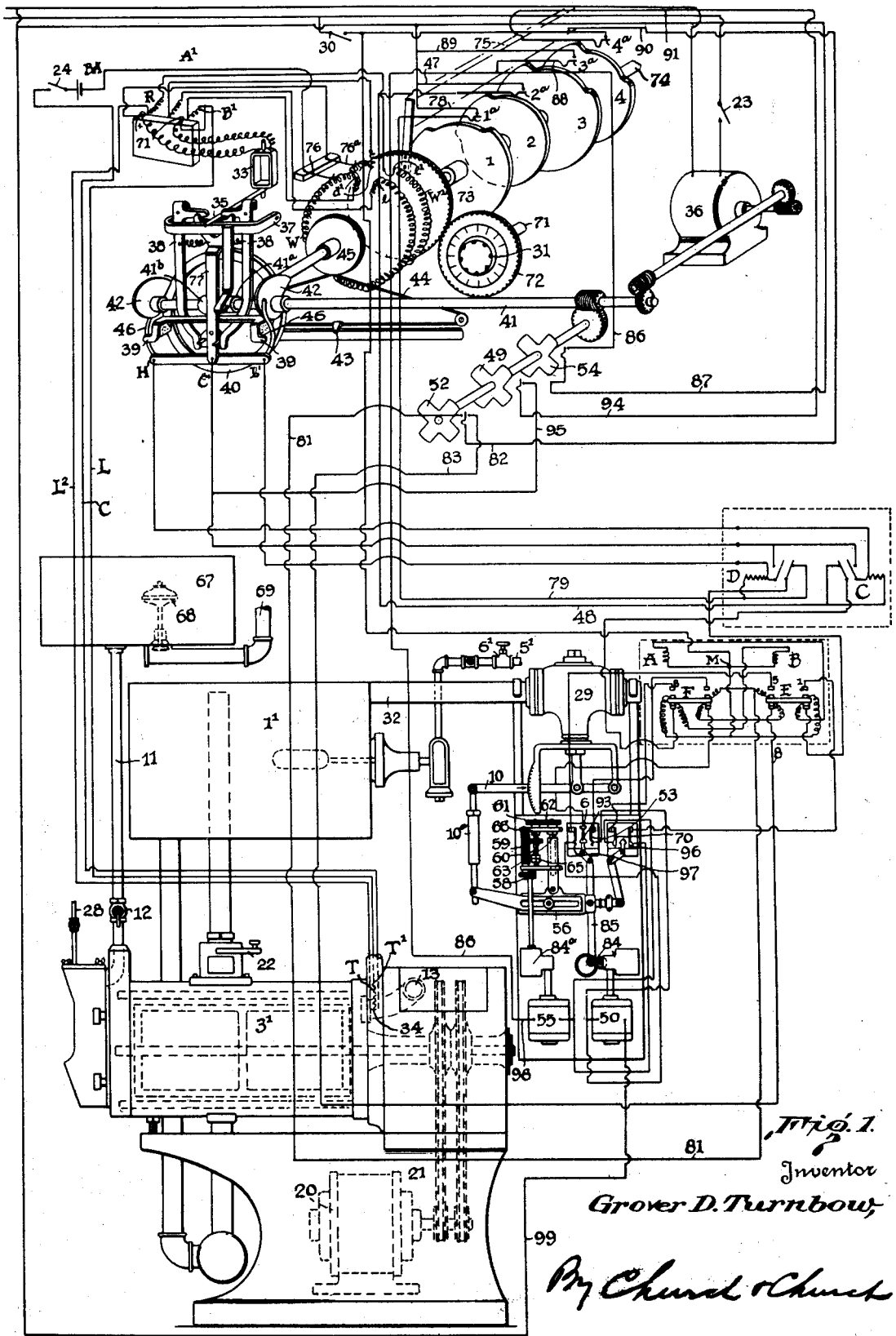
Figure 1 illustrates the freezing apparatus.

In the carrying out of the invention, it is desirable to maintain a continuous and uniform flow of the mix to be frozen through the apparatus whereby a continuous freezing thereof may take place. At the same time, the whipping operation which is preferably carried on after the freezing of the mix has been substantially completed, is conducted in the presence of an adequate supply of air under uniform pressure, usually atmospheric. The whipping apparatus is also preferably operated at a uniform speed and at such a rate as to at all times incorporate air or gas to the maximum air or gas-holding capacity of the mix at the temperature used in the apparatus. That is, with the preferred form of apparatus it is first determined the percentage or volume of air or gas that is to be incorporated in the finished frozen product, and the apparatus is then set for the temperature at which the mix will take up and hold such predetermined volume of air or gas. The whipping apparatus is then set to operate at a uniform speed and at such a rate as to incorporate that percentage or volume of air in the mix. The mixture, when being whipped, is also maintained at a substantially definite volume. Where the product is produced in successive batches, it is immaterial at what point the temperature control element is associated with the mix in the freezing chamber, but where the freezing is performed continuously as above described, it is preferred that this temperature control element be associated with the mix at a point in proximity to that at which the frozen aerated product is discharged from the freezing compartment. In other words, where the process of freezing is continuous, the temperature of the mix will be reduced as the material passes through the freezing apparatus, and it is, therefore, preferred that the temperature of the material be regulated to the desired fraction of a degree at a point in close proximity to that where the whipping operation is completed, or, as just mentioned, in proximity to the point at which the frozen aerated material is discharged from the freezing apparatus.

As has been before suggested, various forms of apparatus can be utilized in carrying out the present invention. There has, therefore, been disclosed in the present instance, a diagrammatic illustration of apparatus which consists of two surge drums (1') and (2') above the freezing and whipping units (3') and (4') respectively, which are filled with liquid ammonia through pipe (5') by opening hand valve (6'). The desired control points for freezing temperature and yield temperature are set on the control mechanisms hereinafter described. The motor operated valve (9) is set in the position indicated for "freezing", by means of lever (10).

From a suitable supply tank (67) under sufficient pressure to provide continuous flow, to which there is connected a supply of mix through line (69), the amount of mix in tank (67) being regulated by float valve (68), a volume of previously flavored and colored unfrozen ice-cream mixture, equal to one-half the volume of cylinder (4') is introduced into cylinder (4') by means of pipe (11) and valve (12). Cylinder (3') and pipe (13) are essentially a part of the line employed in placing desired amount of mixture in cylinder (4'), and consequently remain substantially filled with said mixture when valve (12) is closed.

By means of a drive motor (15) located in base of cylinder (4') and chain transmission under housing (14) agitating mechanism in cylinder (4') is actuated at a suitable speed. Said agitating mechanism is put in operation by means of push button station, closing drive motor circuit, and stop valve (16) is opened allowing liquid ammonia to flood annular space surrounding cylinder (4') extracting heat from the contents therein. Ammonia vapor is pumped to the compressor through line (17) and motor operated valve (9). The "freezing" process is continued until the desired temperature and condition of the product is attained. The control mechanism for valve (9) is rendered operative by closing switch (18) and the temperature of the product recorded by closing switch (19).

When the proper conditions of temperature and consistency have been attained, stop valve (16) is closed, the resulting pressure developed within the annular space surrounding the freezing cylinder (4'), discharges the refrigerant contained therein and the so-called whipping phase is inaugurated. At this point, the agitating mechanism in cylinder (3') is actuated by push button control closing drive motor circuit to drive motor (20) located in base and chain transmission under housing (21). Stop valve (22) is opened allowing liquid ammonia to flood annular space surrounding cylinder (3') extracting heat from the product therein. Ammonia vapor is pumped to the compressor through line (32) and motor operated valve (29). Control mechanism for the freezing medium supply is put in operation by closing switch (23) and temperature of product in cylinder (3') is recorded by closing switch (24).

The desired condition of product in both cylinders is thus attained simultaneously.

When such predetermined conditions of product exist, motor operated valve (9) is set in position indicated for "continuous operation" by means of the adjustable link (10a) through which lever (10) is actuated; stop valve (16) is opened; motor valve circuit is closed by means of switch (25).

Valve (12) in mix feed line is opened to position indicated for given volume required, and discharge weir is adjusted by means of slide (26) to maintain volume of product within cylinder (4') to approximately one-half full.

Air is introduced through pipe (28) into cylinder (3') in quantities less than that required in finished product, and air is introduced into cylinder (4') in quantities in excess of that required in finished product by means of pipe (27). Motor operated valve (29) is then put into operation by means of switch (30).

The apparatus now operates under automatic control, essentially as follows, the mechanism being the same for the freezing as for the whipping:

By means of dials (31) (31) suitably graduated to cover the control range of the instrument, suitably mounted on shaft, (71)(71), and concentric with sprocket (72)(72) meshing with sprocket (73)(73) which is free to rotate on shaft (74)(74), the spring contacts (1a, 2a, 3a, 4a) (1a, 2a, 3a, 4a) attached as a unit in fixed position on insulated support (75) (75) which is attached to sprocket (73)(73) are made to rotate circumferentially to their respective co-operating contact discs (1, 2, 3, 4)(1, 2, 3, 4) to the position corresponding to the point of control desired in the process.

Figure 2:
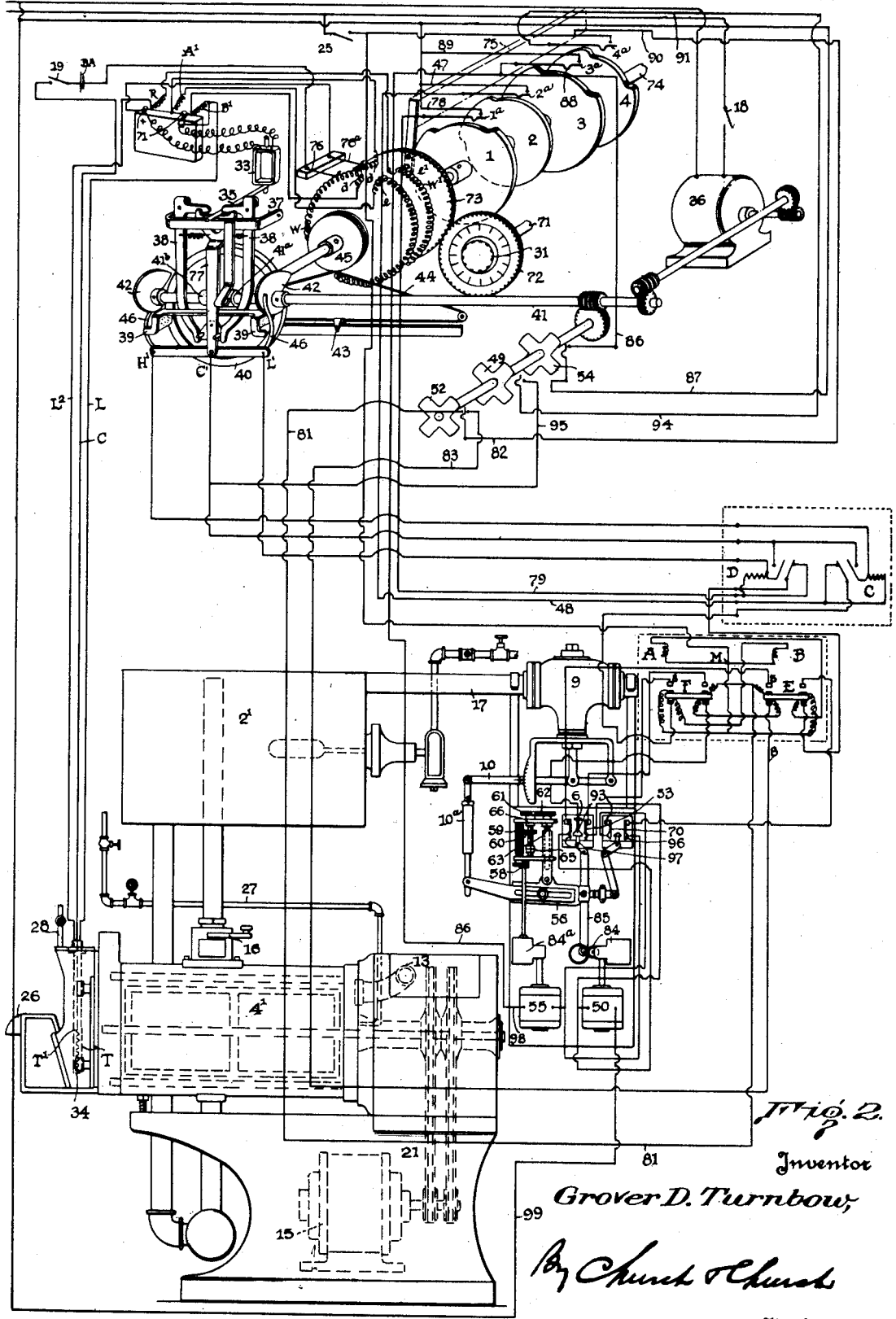
Fig. 2 illustrates the aerating apparatus, the aerating chamber of which communicates with the freezing compartment of Figure 1.

With spring contacts set in desired position and switches (23, 24, 30) in Fig. 1, and switches (18, 19, 25) in Fig. 2, closed, the system operates to bring the temperature of the product in which is immersed the resistance thermometer (34) (34) to the temperature corresponding to dial settings.

The resistance thermometers (34) (34) constitute the unknown resistance in one arm of the Wheatstone bridge system which actuates the galvanometer coils (33) (33) and is in opposition to the known resistance (R) (R). In the ratio arms of the Wheatstone bridge are the resistances (A') (A') and (B') (B') suitably mounted with resistance (R) (R) and galvanometer terminals (71) (71) on rubber block. Between the bridge arms including the resistance (R) (R) and (A') (A') and the bridge arms including the resistances (B') (B') and the resistances of the thermometers are the slide wire resistances (W) (W) and (W') (W') respectively, attached to shafts (74) (74) in fixed position so that when points (d) (d) and (d') (d') are in contact with the co-operating sliding contacts (76) (76) the pen (43) (43) will be at the minimum range of the scale, and when points (e) (e) and (e') (e') are in contact with sliding contacts (76) (76) the pen (43) (43) is at the maximum range of the scale. Contacts (76) (76)—(76a) (76a) are rigidly mounted and tension suitably maintained by means of set screws. The resistance of the thermometer (34) (34) is substantially equal to resistance (R) (R) at the minimum point of the temperature range. The leads (L) (L) and (L²) (L²) are of equal length and resistance. The potential is the cell (BA) (BA) connected in the conductor (C) (C), one terminal of which is at point (T') (T') immediately adjacent to resistance (T) (T) and whose other terminal is slide wire contacts (76) (76). Closing of the switches (19) and (24) energizes the system causing deflections of the galvanometer coils (33) (33) and attached pointers (35) (35) in proportion to the state of unbalance of the Wheatstone bridge system. The potential set up by cell (BA) (BA) when switch (19) and (24) are closed sends current through resistances (T) (T) in thermometer (34) (34) through leads (L) (L), resistance (B') (B'), slide wire resistance (W) (W), galvanometer coil (33) (33) and to slide wire contacts (76a) (76a), also through leads (L²) (L²) to resistance (R) (R) and slide wire resistance (W') (W') slide wire contacts (76) (76) and resistance (A') (A').

By means of motor (36) (36), actuated by switches (23) and (18) and suitable shafts and gears, rocker arm (37) (37) is raised by means of lift cams (41a) (41a) on shafts (41) (41) engaging galvanometer pointers (35) (35) in their deflections, between the normally horizontal members of rocker arms (38) (38) which extend toward each other leaving a gap of sufficient width between their inner ends to allow the free entry of the pointers (35) (35) when galvanometer system is in a state of balance or zero deflection. The lower portion of the arms (38) (38) held together by suitable spring, co-operate with pins shown in triangular plates attached to arm (77) (77) which co-operation causes rotary movement of arms (39) (39) at the extremities of which are cork tips provided to make frictional contact with clutch disc (40) (40). While lift cams (41a) (41a) raise rocker arm (37) (37), lift cams (41b) (41b) lift clutch arms (39) (39) away from clutch disc (40) (40) while they are being rotated proportionally to the deflection of the galvanometer. The pointers (35) (35) are then released when lift cams (41a) (41a) allow rocker arms (38)

(38) to drop and clutch arms (39) (39) drop against clutch disc (40) (40) frictionally engaging therewith at their extremities. Cams (42) (42) then force clutch arms (39) (39) into normal horizontal position thus rotating disc clutch (40) (40) on central shaft to which are attached the control discs (1, 2, 3, 4)—(1, 2, 3, 4) and slide wire resistances (W—W') (W—W') and moving pen carriages (43) (43) by means of violin strings (44) (44) wound around pulley on central shaft (74) (74) and pulleys (45) (45) to new position indicating temperature existing in the product being processed, properly closing contacts (1a, 2a, 3a, 4a) (1a, 2a, 3a, 4a) to operate control valves (9) and (29), and moving slide wire resistances to balance the bridge under the new set of conditions of temperature of the product.

Referring to Figs. 1 or 2 and assuming that the temperature of the product has dropped below the temperature indicated on the dial (31) (31) the operation of the motor valve control assembly to correct the temperature deviation is as follows: The initial stroke motor (50) (50) is energized immediately as the temperature passes below the control point by means of the closing of contact (1a) (1a) co-operating with control disc (1) (1) which has moved in counter clockwise rotation through action of galvanometer pointer and combined engaging mechanism. This movement closes the circuit from the main circuit at (78) (78) through conductor (79) (79) through back contacts of relay (D) (D), back contacts of relay (B) (B), through coil, relay (A) (A) to the junction (M) (M) with the other leg of the main circuit (M) (M) energizing relay (A) (A) to lift armature (F) (F) and close circuit through contacts (3) (3) and (4) (4). Circuit from (3) (3) passes through limit switch (70) (70) to decreasing field coil of motor (55) (55) through motor armature and conductor (86) (86) to interrupter (54) (54) to the contact (3a) (3a) to the main circuit. Contact (4) (4) completes circuit through limit switch (53) (53), decreasing field coil of motor (50) (50) through armature and conductor (99) (99) to the main circuit on one side and through conductor (81) (81) to the inner contact of interrupter (52) (52) to the main circuit on the other side. Thus decreasing field coil of motor (55) (55) is energized only when contacts (3a) (3a) or interrupter (54) (54) is closed and decreasing field coil of motor (50) (50) is operative only when contact (1a) (1a) and inner contact of interrupter (52) (52) are closed. The contacts of the conductors (81) (81), (82) (82), (83) (83) may preferably be kept permanently closed and the interrupter (52) (52) made inoperative. Motor (50) (50) thus energized moves valve (9) (29) a single stroke toward the closed position of the valve (9) (29) by means of suitable reduction gears (84) (84) arms (85) (85) and (56) (56) which is suitably pivoted on instrument box and connected to arm (10a) (10a) and (10) (10) a definite increment determined by setting of limit switch (53) (53).

Simultaneously the decreasing field coil of the motor (55) (55) through the closing of relay (A) (A) and armature contact (3) (3) and limit switch (70) (70) is operative when jack shaft interrupter (54) (54) closes circuit at regular intervals between the contacts of conductors (86) (86) and (87) (87), moving entire valve mechanism (56) (56) in small increments effective as actual changes in opening of valve (9) (29) only after the elongated gear (59) (59) suitably meshed with gear reduction unit (84a) (84a) through gear (58) (58) of motor (55) (55) has screwed sprocket (60) (60) into engagement with lock nuts (66) (66) co-operating with gears (61) (61)—(62) (62) and screw shaft (63) (63) connected to lever (56) (56). The limit switch (70) (70) is set to short circuit motor at the point where valve (9) (29) is effectively closed. The motor (50) (50) having closed the valve one full stroke remains short circuited through medium of limit switch (53) (53) as long as the temperature of the product remains below the control point and does not turn to approach the control point. The same movement of limit switch (53) (53) which breaks the circuit through the decreasing field coil of motor (50) (50) moves common contact (6) (6) to close a potential circuit through the increasing field coil of motor (50) (50) by making contact through limit switch (93) (93). The motor (55) (55) continues to close the valve in small regularly timed steps after the lag provided between locknuts (65) (65)—(66) (66) has been traversed. If the temperature of the product continues to fall below the control point to a fixed degree, the disc (3) (3) co-operating with spring contacts (3a) (3a) is rotated to such degree as the raised portion closes the contact (3a) (3a) thus short circuiting the interrupter contacts (54) (54) which are connected in parallel with contact (3a) (3a) and causing motor (55) (55) to operate continuously.

Assuming now that the minimum temperature of product has been reached, the valve having closed sufficiently to arrest the temperature-drop in the product being processed, the resistance (T) (T) in thermometer (34) (34) causes an opposite deflection of the galvanometer, (33) (33) and pointer (35) (35) and combined engaging mechanism rotate central shaft (74) (74) carrying contact discs (1, 2, 3, 4)—(1, 2, 3, 4,) and slide wire resistances (W) (W)—(W') (W') in the opposite or clockwise direction.

Until the temperature of the product has returned to within a given fixed range of the control point, as determined by adjustable raised portion of contact disc (3) (3) motor (55) (55) continues to close the valve by steady operation. When the temperature of the product approaches within the range of the depressed portion of the contact disc (3) (3) contact is broken between the conductors (88) (88)—(89) (89) and circuit renewed through interrupter (54) (54) and conductors (86) (86)—(87) (87) at regular intervals.

As the temperature of the product, approaching the control point, comes within the range of the adjustable depressed area of the contact disc (4) (4) contact is made at (4a) (4a) by conductors (90) (90)—(91) (91) thus closing the circuit in respect to the contact (4a) (4a). With temperature of the product approaching the control point the right hand sweep cam (L') (L') closes the circuit with the conductor (C') (C'), by the co-operating spring contact (46) (46) connecting (L') (L') to cams (42) (42), interrupter contact (49) (49) between conductors (94) 94) and (95) (95) is closed, energizing relay (D) (D), and de-energizing relay (A) (A) allowing the closing of circuit between (6) (6)—(8) (8) which is completed through outer interrupter contact connecting conductors

(82) (82) and (83) (83) and closed contact at contact disc (4) (4) and contacts (4a) (4a) to the main circuit.

The increasing field coil of motor (50) (50) is thus energized to impart a definite anticipatory movement in valve (9) (29) toward the open position, the magnitude of said movement being determined by the mechanical adjustment of limit switch (93) (93) at (6) (6). The movement of limit switch (53) (53) which opens the common contact (6) (6) with the increasing field coils of motor (50) (50) closes the circuit at the limit switch to the decreasing field coils of motor (50) (50) thus setting up that contact for the complete closure of the circuit through relay (A) (A) and contact (1a) (1a). This anticipatory feature allows motor (50) (50) to cut back the valve position any desired amount thus tending to prevent "hunting" and "overshooting". The valve remains in this position until interrupter (49) (49) in series with contact (4a) (4a) and relay (D) (D) breaks the circuit, at which time relay (D) (D) is de-energized, and by means of contact (1a) (1a) and interrupter (52) (52) relay (A) (A) is re-energized actuating decreasing field coil of motor (50) (50) to close valve (9) (29) to the original degree allowed by limit switch (53) (53). Simultaneously decreasing field coil of motor (55) (55) by means of contact (1a) (1a), interrupter (54) (54), conductors (86) (86)—(87) (87) and contacts (3) (3) of relay (A) (A) is energized to move the valve toward the closed condition in small regular increments as determined by the interrupter (54) (54). As sweep cam (L') (L') again closes the circuit with (C') (C') with contacts (4a) (4a) and interrupter (49) (49) closed energizing relay (D) (D), relay (A) (A) drops out and the anticipatory movement is repeated, followed again by the process of returning the valve to the closed position. Such step reduction of the temperature differential is continued until the control point is reached. At the control point and unity temperature differential, contacts (1a, 2a, 3a, 4a)—(1a, 2a, 3a, 4a) are open and there is consequently no movement in the motor valve mechanisms. As the control point is crossed and the existing temperature becomes greater than that desired, contact (2a) (2a) will have been made with conductors (47) (47) and (48) (48), the current passing back contacts of relay (C) (C), back contacts of relay (A) (A) to field coil of relay (B) (B) to main line at (M) (M), thus energizing relay (B) (B) to lift armature (E) (E) and close contact (1) (1) and (5) (5) completing circuit to inner contact of interrupter (52) (52) through line (81) (81) and (82) (82) and to limit switches (96) (96)—(97) (97) respectively, through increasing field coil of motor (50) (50) to armature through conductor (99) (99) to main line, through increasing field coil of motor (55) (55) through armature, conductor (98) (98) to interrupter contact (54) (54) and contact (3a) (3a) in parallel with interrupter (54) (54).

Thus motor (50) (50) moves valve toward the open position a definite step determined by limit switch (97) (97) when inner contact at interrupter (52) (52) is made and contacts (2a) (2a) closed.

Simultaneously, motor (55) (55) is suitably energized to move entire valve mechanism (56) (56) in small increments effective as actual changes in the opening of the valve (9) (29) only after the elongated gear (59) (59) suitably meshed with gear reduction unit (87) (87) has screwed sprocket (60) (60) into engagement with locknuts (65) (65) co-operating with gears (61) (61)—(62) (62) and screw shaft (64) (64) suitably connected to lever (56) (56). The limit switch (96) (96) is set to break the circuit when valve (9) (29) is effectively opened.

When and if the deviation of temperature becomes great enough to close contact (3a) (3a), interrupter (54) (54) is rendered ineffective and motor (55) (55) operates continuously until stopped by limit switch (96) (96). The same movement of limit switch (97) (97) which breaks the circuit through the increasing field coil of motor (50) (50) moves common contact (6) (6) to close a potential circuit through the decreasing field coil of motor (50) (50) by making contact through limit switch (93) (93). As the temperature deviation becomes checked and turns to approach the control point again, at a given range above the control point contact disc (3) (3) co-operating with contact (3a) (3a) opens (3a) (3a) and interrupter (54) (54) again becomes effective controlling the increments of valve opening in regular steps of magnitude dependent on the rotation of the interrupter (54) (54). As the temperature reaches a suitable value above the control point the adjustable depressed portion of contact disc (4) (4) co-operating with contact (4a) (4a) will close contact (4a) (4a) involving conductors (90) (90) and (91) (91) closing the circuit with respect to the contact (4a) (4a).

With the temperature of the product approaching the control point the galvanometer pointer deflects in the opposite direction and engaging mechanism causes sweep cam (H') (H') to close circuit with (C') (C') through the co-operating spring contact (46) (46) connecting (H') (H') to cams (42) (42) when contacts (4a) (4a) and contacts at interrupter (49) (49) are closed energizing relay (C) (C) and throwing out relay (B) (B) thus closing the circuit between the common contact (6) (6) and (8) (8) which is completed through outer contacts of interrupter (52) (52) involving conductors (82) (82) and (83) (83) and closed contact at contacts (4a) (4a) effected through co-operation of contact discs (4) (4), thence to the main circuit to energize decreasing field coil of motor (50) (50) imparting a definite anticipatory movement in valve (9) (29) toward the closed position, the magnitude of said movement being determined by the mechanical adjustment of limit switch (93) (93) at (6) (6). The valve remains in this position until interrupter (49) (49) in series with contact (4a) (4a) and relay (C) (C) breaks the circuit at which time relay (C) (C) is de-energized and by means of contact (2a) (2a) and interrupter (52) (52) closing circuit between conductors (81) (81) and (83) (83), relay (B) (B) is re-energized lifting armature (E) (E) and closing circuit through (5) (5) to energize increasing field coil of motor (50) (50) to open valve (9) (29) to the original degree allowed by the limit switch (97) (97). Simultaneously increasing field coil of motor (55) (55), by means of contact (2a) (2a), interrupter (54) (54), conductors (86) (86) and (87) (87), and contact (1) (1), is energized to move the valve toward the open position in small regular increments as determined by the interrupter (54) (54). As sweep cam (H') (H') again closes the circuit with (C') (C') energizing relay (C) (C), relay (B) (B) drops out and the anticipatory movement is repeated followed again by the process of returning the valve to the open position. Such step movement of the valve continues until the control point is again attained, temperature differential is unity, and contacts (1a, 2a, 3a, 4a)—(1a, 2a, 3a, 4a) are open.

As long as the temperature remains in agreement with the setting of dial (31) (31) and the galvanometer is in a state of balance, motors (50) (50) and (55) (55) are de-energized and the valve (9) (29) remains in position balanced with rate of heat exchange in the product being processed.

Such apparatus has not been described in detail but it may be added that the Wheatstone bridge device follows the teachings of Letters Patent No. 1,097,651; the mechanism controlled directly by the galvanometer needle is taken from Patents Nos. 1,332,182 and 1,830,333; the jack shaft arrangement and the relays, illustrated (49), (52), (54), are from Patent No. 1,829,772; and the motor operated connections of actuating valves (9) and (29) are shown in detail in Patent No. 1,739,903. Reference is made to these various patents for a full disclosure of the construction and operation of said devices.

What I claim is:

1. The method of manufacturing frozen food products having a predetermined volume of a gas such as air incorporated therein, which consists in supplying the constituents to be frozen, partially freezing said constituents, whipping said constituents in the presence of gas to incorporate the gas therein, the extent to which the mixture is frozen being maintained at a predetermined point, while whipping, said predetermined point being such that the predetermined quantity of gas only is retained in the mixture upon completion of the whipping, notwithstanding the presence of excess gas and independently of the duration of the whipping period.

2. The method of manufacturing frozen food products having a predetermined volume of a gas such as air incorporated therein, which consists in continuously supplying the constituents to be frozen, partially freezing said constituents, whipping said constituents in the presence of gas to incorporate the gas therein, maintaining the extent to which the mixture is frozen at a predetermined point in close proximity to the completion of the whipping operation, said predetermined point being such that the predetermined quantity of gas only is retained in the mixture upon completion of the whipping, notwithstanding the presence of excess gas and independently of the duration of the whipping period.

3. The method of manufacturing frozen food products having a predetermined volume of a gas such as air incorporated therein, which consists in continuously supplying the constituents to be frozen, partially freezing said constituents to be frozen, whipping said constituents at a uniform rate of speed in the presence of gas to incorporate the gas therein, maintaining the partially frozen mixture at substantially a definite temperature at a point in close proximity to the point of completion of the whipping operation, said temperature being such that only the predetermined volume of gas is incorporated in the mixture upon completion of the whipping, independently of the duration of the whipping period and of any excess gas coming in contact with the mixture while being whipped.

4. The method of manufacturing frozen food products having a predetermined volume of gas such as air incorporated therein, which consists in continuously supplying the constituents to be frozen, partially freezing said constituents, continuously whipping a substantially uniform volume of said mixture at a uniform rate of speed in the presence of gas in excess of said predetermined volume to incorporate gas therein, maintaining the partially frozen mixture at substantially a definite temperature at a point in close proximity to the point of completion of the whipping operation, said temperature being such that the predetermined volume of gas is incorporated in the mixture upon completion of the whipping.

5. The method of manufacturing frozen food products having a predetermined volume of gas such as air incorporated therein, which consists in continuously supplying the constituents to be frozen, partially freezing said constituents, continuously whipping said constituents in the presence of gas in excess of said predetermined volume to incorporate gas therein, and limiting the incorporation of gas to the predetermined percentage by maintaining the partially frozen mixture at substantially a definite temperature at a point in close proximity to the point of completion of the whipping operation.

6. The method of manufacturing frozen food products having a predetermined volume of gas such as air incorporated therein, partially freezing the constituents entering into said food product, whipping said constituents in the presence of gas in excess of said predetermined volume to incorporate gas therein, automatically controlling the percentage of gas incorporated therein by bringing the partially frozen mixture while being whipped to a temperature at which the predetermined percentage of gas will be incorporated and held in the mixture and maintaining said temperature during the whipping period.

GROVER D. TURNBOW.